E. S. JONES.
HORSE DETACHER AND CONTROLLER.
APPLICATION FILED JULY 11, 1913.
1,104,049.
Patented July 21, 1914.
2 SHEETS—SHEET 1.
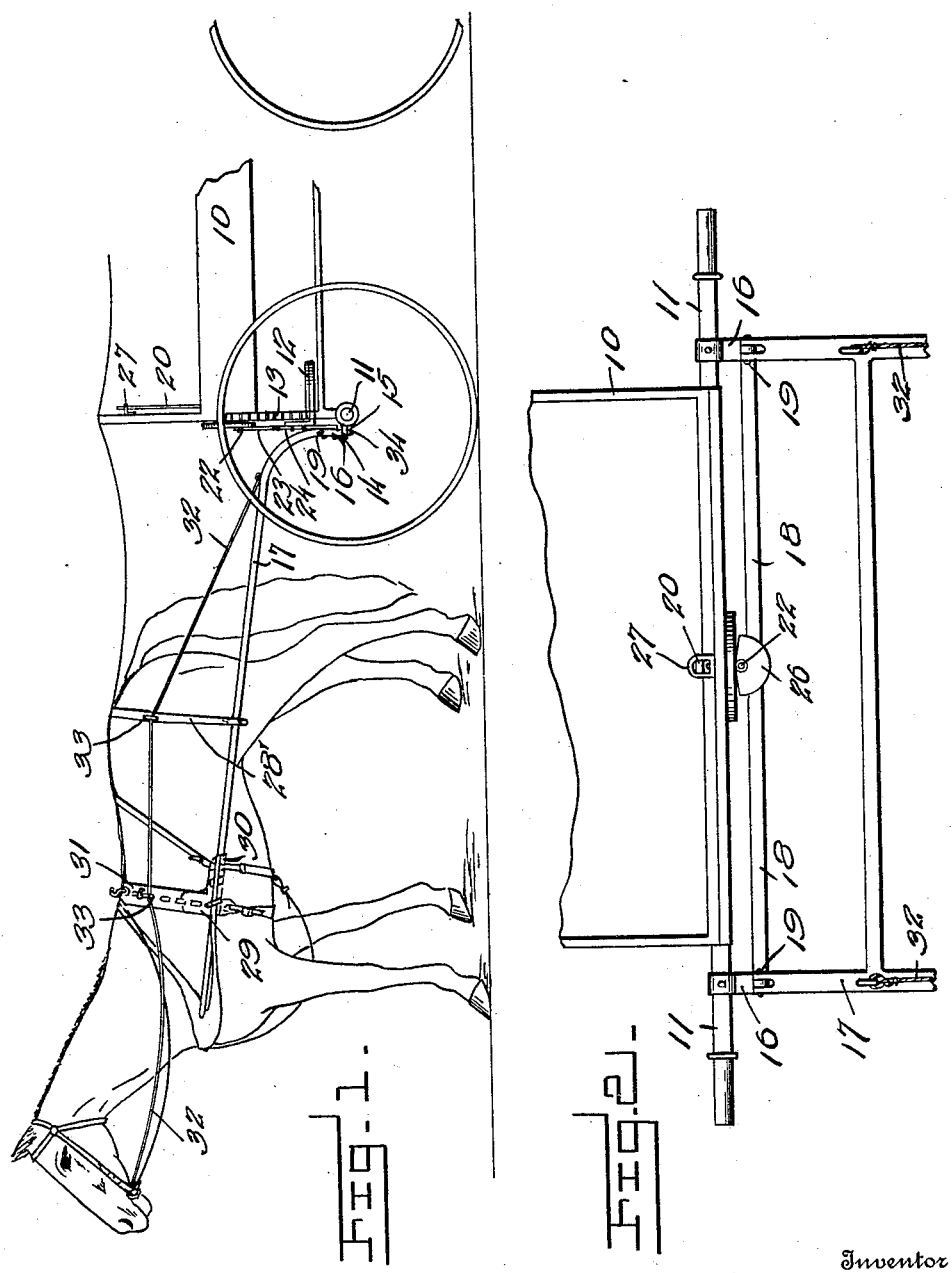
Inventor
E. S. Jones.
Witnesses
By H. S. Woodward
Attorney

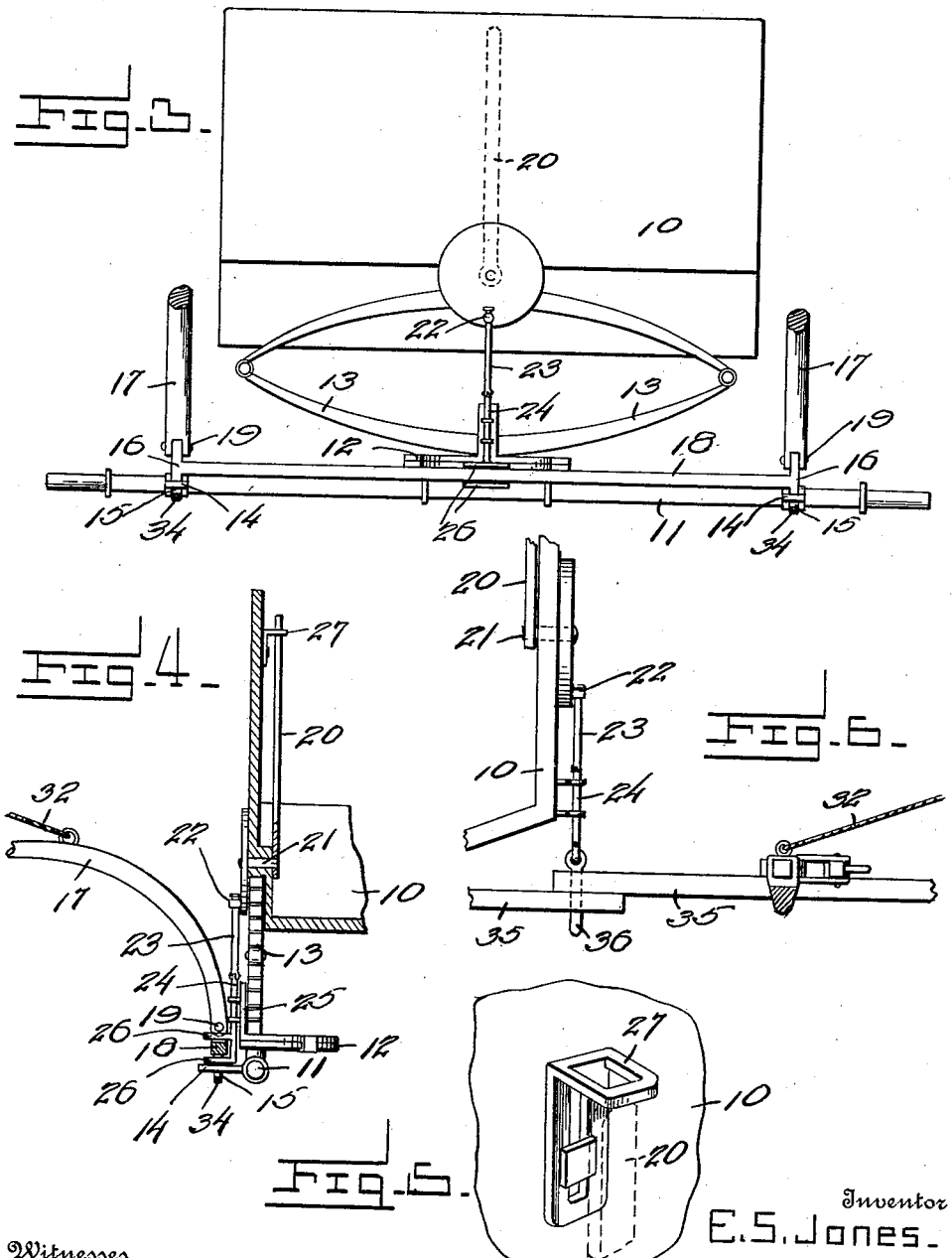

UNITED STATES PATENT OFFICE.

EDWARD S. JONES, OF MOBILE, ALABAMA, ASSIGNOR OF ONE-HALF TO GERSON COHN.

HORSE DETACHER AND CONTROLLER.

1,104,049.  Specification of Letters Patent.  Patented July 21, 1914.

Application filed July 11, 1913. Serial No. 778,512.

*To all whom it may concern:*

Be it known that I, EDWARD S. JONES, a citizen of the United States, residing at Mobile, in the county of Mobile and State of Alabama, have invented new and useful Improvements in Horse Detachers and Controllers, of which the following is a specification.

The invention has for an object not only to release an animal from a vehicle, but to control the animal after release, so as to minimize liability of the loss of the animal or damage thereto by its continued flight after release, as well as reduce liability of damage to persons and property.

It is an important object to effect the restraint of the animal in a humane way without liability of frightening the animal, but by putting a backward pressure on the bridle bit, so that the animal may be brought to a gradual stop in a natural way.

A further important aim is to attain this operation without mechanical parts or mechanism liable to impedance in operation.

A further aim is to provide a releasing mechanism especially adapted to coöperate with the hold-back or controlling device.

Additional objects and advantages will be apparent from the following description, and from the drawings, in which, Figure 1 is a side view of a team equipped with my invention. Fig. 2 is a fragmentary top view of the vehicle. Fig. 3 is a front view of the vehicle. Fig. 4 is a fragmentary longitudinal sectional view thereof. Fig. 5 is a detail perspective view of the catch for the controlling lever. Fig. 6 is a fragmentary side view of a modified releasing mechanism.

There is illustrated a vehicle 10 of ordinary construction having a pivoted front axle 11 and the usual fifth wheel 12, over which is carried the spring 13, the construction of these parts being well understood and therefore shown formally.

Carried by the axle adjacent each side there are horizontal supporting ears 14, centrally apertured and receiving downwardly therethrough tenons 15 formed on the lower ends of the thill-couplings 16 of the shafts 17. The latter are otherwise of ordinary construction, except that between the thill-couplings at their lower ends there is extended a cross bar 18. The shafts are pivoted as at 19 on the couplings. Mounted pivotally within the dash board there is a lever 20, carried by the stud shaft 21 projecting forwardly through the base of the dash board and carrying an eccentric wrist 22 revoluble and having a vertical bore therethrough in which there is slidable a headed link 23 connected to the upper end of a stem 24, mounted slidably upon an upright 25 carried upon the upper circle iron in the fifth wheel. This stem carries two horizontal concentric semi-circular plates 26 engaged above and below the cross bar 18, respectively. Thus upon oscillation of the lever the bar 18 is lifted, disengaging the couplings 16 and leaving the shafts free to be pulled forwardly away from the vehicle. The lever may be held against accidental operation by a vertical slidable catch 27 carried upon the inner side of the dash and having a horizontal apertured portion adapted to engage over the upper end of the lever.

The harness by which the horse is attached to the vehicle and controlled may be of any customary type, but should include a hip strap 28 engaged with the shafts intermediately of their length, which, however, should be very loosely engaged with the shafts, so that when the latter are disengaged from the vehicle, they will tend to fall a considerable distance without interference from the hip strap. The shafts are carried at the forward parts in shaft rests 30 carried by the usual saddle 31, or otherwise, but preferably so arranged so that they may move slightly upwardly with the forward ends of the shafts when released. Thus, the shafts may fall at their rear ends as far as the ground at times under movements of a horse. Emergency reins 32 are connected to the bit and extended rearwardly on each side of the horse through guides 33 on the saddle and on the hip strap, the rear ends of these reins being secured in a suitable manner directly to the shafts near their rear ends. These reins may be formed of any material most suitable for the purpose, such as wire or hemp cable, leather, or fabric. These reins 32 are connected to the shafts in such a way as to put no strain on the bit normally, and a considerable slack may be allowed therein, so that slight variations in the trace adjustment, or slight stretching of the traces will not result in interference by the reins 32.

With a device constructed as described, when the lever is operated the rear ends of the shafts will fall until the slack in the hip strap 28 is taken up, when the movement of the shaft becomes pivotal with the point of support by the hip strap as a center, the forward ends of the shaft rising slightly. Under this action considerable force is applied upon the rear ends of the lines 32 by the weight of the shafts, drawing the lines rearwardly, the resulting action of the bit tending to deter the animal from forward movement. If the animal is running the backward movement of the bit will occur with recurrent jerks, disconcerting the animal and effectively causing it to check its pace. The thill connections are provided with rubber bumpers 34 by which the shafts are prevented from damaging the pavements, but more important still, preventing the making of noise to frighten the animal, as well as aiding in the rebound of the shafts and increasing the force of the jerks upon the reins 32.

In order to enable the application of my invention to the control of double teams I have shown in Fig. 6 a construction in which the hounds are made in two sections as at 35 held together by a pin 36, which may be drawn upwardly by the same mechanism before described, or such mechanical variation thereof as required. The reins 32 are in this case connected to the double-tree, and it is thought better to use but one rein for each horse extended respectively from the outer ends of the double tree on the outer sides of the horses to the bit, where such connections as desired may be made. For instance, by attaching the lines to each right hand side of the bit the team would be caused to move in a circle. Such connections as may be desired may be made, for tending to guide the horses in a straight forward direction.

It is obvious that the invention may be utilized in various other forms than that specifically illustrated and described, within the scope of the invention.

The construction of the device is seen to be very simple and inexpensive, yet has been found very efficient in checking an animal after release from a vehicle, and is quite durable.

In the claims, it will be understood that the term "shaft element" includes a pole shaft for double teams or any other equivalent.

What is claimed is:

1. The combination of a vehicle and detachable shafts, means to hold the shaft normally engaged with the vehicle, means to release the shafts, a harness including a support for the forward parts of the shafts and a bridle element, an emergency rein connected to the bridle element and engaged slidably with a part of the harness at a point above the shafts and intermediately thereof, and connected to the rear part of the shafts.

2. The combination of a vehicle, a rigid shaft element detachably engaged with the vehicle, means for holding the shaft element normally engaged with the vehicle, means for detaching the shaft element, a harness including a bridle element and a support for the forward part of the shaft element, an emergency rein connected to the bridle element and engaged slidably with the harness and connected with the rear part of the shaft for the purposes described.

3. In a releasing and control mechanism, a vehicle, laterally spaced apertured carrying members, a shaft element having tenons adapted to be slidably engaged in the apertures of the carrying members, a transverse bar carried by the shaft element, a vertically slidable member carried by the vehicle having parallel members engaged above and below the bar from the rear, a revoluble member, a crank element thereon, connections between the crank element and the vertically slidable member, and means to rotate the revoluble member.

In testimony whereof I have hereunto set my hand in presence of two subscribing witnesses.

EDWARD S. JONES.

Witnesses:
E. M. POLLARD,
L. N. CLARK.

---

Copies of this patent may be obtained for five cents each, by addressing the "Commissioner of Patents, Washington, D. C."